US012583071B2

(12) United States Patent
Uenishi et al.

(10) Patent No.: US 12,583,071 B2
(45) Date of Patent: Mar. 24, 2026

(54) TOOL MEASURING SYSTEM, AND CONTROL METHOD

(71) Applicant: FANUC CORPORATION, Yamanashi (JP)

(72) Inventors: Daisuke Uenishi, Yamanashi (JP); Kenji Kaihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 505 days.

(21) Appl. No.: 17/997,760

(22) PCT Filed: May 10, 2021

(86) PCT No.: PCT/JP2021/017707
§ 371 (c)(1),
(2) Date: Nov. 2, 2022

(87) PCT Pub. No.: WO2021/230203
PCT Pub. Date: Nov. 18, 2021

(65) Prior Publication Data
US 2023/0158624 A1 May 25, 2023

(30) Foreign Application Priority Data
May 15, 2020 (JP) ................................. 2020-085877

(51) Int. Cl.
*B23Q 15/16* (2006.01)
*B23Q 17/22* (2006.01)

(52) U.S. Cl.
CPC ............. *B23Q 15/16* (2013.01); *B23Q 17/22* (2013.01)

(58) Field of Classification Search
CPC ................................ B23Q 15/16; B23Q 17/22
(Continued)

(56) References Cited

U.S. PATENT DOCUMENTS

2013/0222580 A1* 8/2013 Kurahashi .......... G01B 11/2433
348/135
2015/0220077 A1* 8/2015 Reiser .................. G05B 19/401
700/114
(Continued)

FOREIGN PATENT DOCUMENTS

CN 107077118 A 8/2017
JP S57-113109 A 7/1982
(Continued)

OTHER PUBLICATIONS

International Search Report issued in PCT/JP2021/017707; mailed Jun. 22, 2021.

*Primary Examiner* — Jigneshkumar C Patel

(74) *Attorney, Agent, or Firm* — Studebaker Brackett PLLC

(57) ABSTRACT

The objective of the present invention is to provide a tool measuring system, a control method, and a program with which it is possible for a cutting tool to be measured easily. This tool measuring system is provided with: a tool measuring device; a tool moving unit; a tool measuring unit; a tool correcting unit for feeding back the measured tool length and tool diameter of the cutting tool to a tool diameter correction number and a diameter correction number of the cutting tool; and a program computing unit for computing the operations of the tool measuring device, the tool moving unit, the tool measuring unit, and the tool correcting unit as instructions operable by the machine tool from a one-line control program in order to instruct the machine tool.

7 Claims, 4 Drawing Sheets

(58) Field of Classification Search
USPC ........................................................ 700/159
See application file for complete search history.

(56)                        References Cited

U.S. PATENT DOCUMENTS

| 2016/0318145 A1* | 11/2016 | Kawanishi | ............. | G01B 11/08 |
| 2016/0327938 A1* | 11/2016 | Kawai | ............. | G05B 19/40938 |
| 2017/0113369 A1* | 4/2017 | Chiu | ...................... | B26D 5/005 |

FOREIGN PATENT DOCUMENTS

| JP | H09-300178 A | 11/1997 |
| JP | 2003-305627 A | 10/2003 |
| JP | 2007-185771 A | 7/2007 |
| JP | 2019-070953 A | 5/2019 |
| JP | 2020-057320 A | 4/2020 |

* cited by examiner

EXAMPLE OF G-CODE

G910 S_T_E_H_B_X_Y_C_F_M_D

| | PARAMETER |
|---|---|
| ESSENTIAL | S:MEASUREMENT MODE |
| | H:LENGTH AND DIAMETER CORRECTION NUMBERS FOR CUTTING TOOL |
| OPTIONAL | B:TEMPORAL TOOL LENGTH (mm) |
| | T:TOOL START NUMBER |
| | E:TOOL END NUMBER |
| | F:FIRST FEED SPEED (mm／min) |
| | X:X-DIRECTION POSITIONING (mm) |
| | Y:Y-DIRECTION POSITIONING (mm) |
| | C:SPINDLE PHASE (mm／min) |
| | D:TOOL LENGTH AND DIAMETER CORRECTION START NUMBERS |

TOOL MEASURING SYSTEM, AND CONTROL METHOD

TECHNICAL FIELD

The present invention relates to a tool measuring system and a control method.

BACKGROUND ART

Typically, a numerical control device that controls, e.g., a machine tool executes, e.g., workpiece machining by a machining program (see, e.g., Patent Document 1). A machining program processing device described in Patent Document 1 calculates a correction reference point based on a tool tip point command position and a tool posture command angle commanded by the machining program, and rewrites the tool tip point command position to the position of the correction reference point.

Patent Document 1: Japanese Unexamined Patent Application, Publication No. 2019-70953

DISCLOSURE OF THE INVENTION

Problems to be Solved by the Invention

The numerical control device performs not only workpiece machining but also measurement of a tool such as a cutting tool by the machining (control) program. However, for automatically executing measurement of the cutting tool, a macro program using a variable, etc. needs to be created. However, for creating the macro program for measurement, a professional having a skill for programming is required. For this reason, there has been a demand for easy measurement of the cutting tool in the machine tool.

Means for Solving the Problems

A tool measuring system according to the present disclosure includes a tool measuring instrument that detects an edge of a cutting tool in a machine tool, a tool moving unit that moves the cutting tool to the tool measuring instrument in the machine tool, a tool measuring unit that measures the length and diameter of the cutting tool based on the coordinates of the edge detected by the tool measuring instrument, a tool correcting unit that feeds back the measured length and diameter of the cutting tool to tool length and diameter correction numbers for the cutting tool, and a program computing unit that computes a command executable by the machine tool from a one-line control program for commanding the machine tool to operate the tool measuring instrument, the tool moving unit, the tool measuring unit, and the tool correcting unit.

The method for controlling the tool measuring system according to the present disclosure includes the step of computing the command executable by the machine tool from the one-line the control program for commanding the machine tool, the step of detecting the edge of the cutting tool in the machine tool according to the executable command, the step of moving the cutting tool to the tool measuring instrument in the machine tool according to the executable command, the step of measuring, according to the executable command, the length and diameter of the cutting tool based on the coordinates of the edge detected by the tool measuring instrument, and the step of feeding back the measured length and diameter of the cutting tool to the tool length and diameter correction numbers for the cutting tool according to the executable command.

Effects of the Invention

According to the present invention, the cutting tool can be easily measured.

BRIEF DESCRIPTION OF THE DRAWINGS

FIG. 2 is a view showing the outline of a machine tool;

FIG. 3 is a view showing a specific example of a control program; and

PREFERRED MODE FOR CARRYING OUT THE INVENTION

Figure 1:
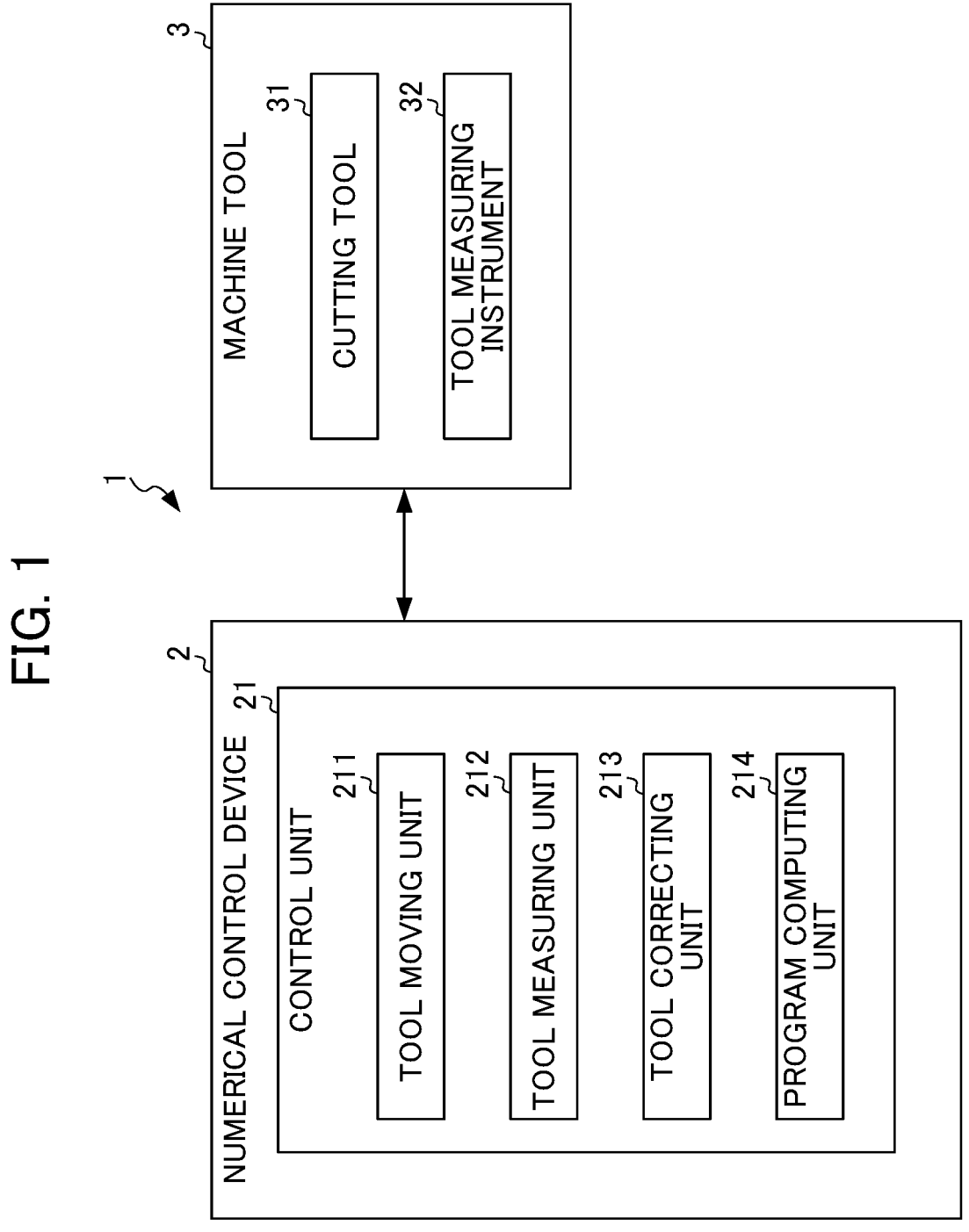
FIG. 1 is a diagram showing the configuration of a tool measuring system.

Hereinafter, an embodiment of the present invention will be described as one example. FIG. 1 is a diagram showing the configuration of a tool measuring system 1. As shown in FIG. 1, the tool measuring system 1 includes a numerical control device 2 and a machine tool 3.

The numerical control device 2 is a device that controls the machine tool 3 to perform, e.g., predetermined machining. The numerical control device 2 includes a control unit 21. The control unit 21 is a processor such as a central processing unit (CPU), and functions as a tool moving unit 211, a tool measuring unit 212, a tool correcting unit 213, and a program computing unit 214 by executing programs stored in a storage unit (not shown).

Figure 2:
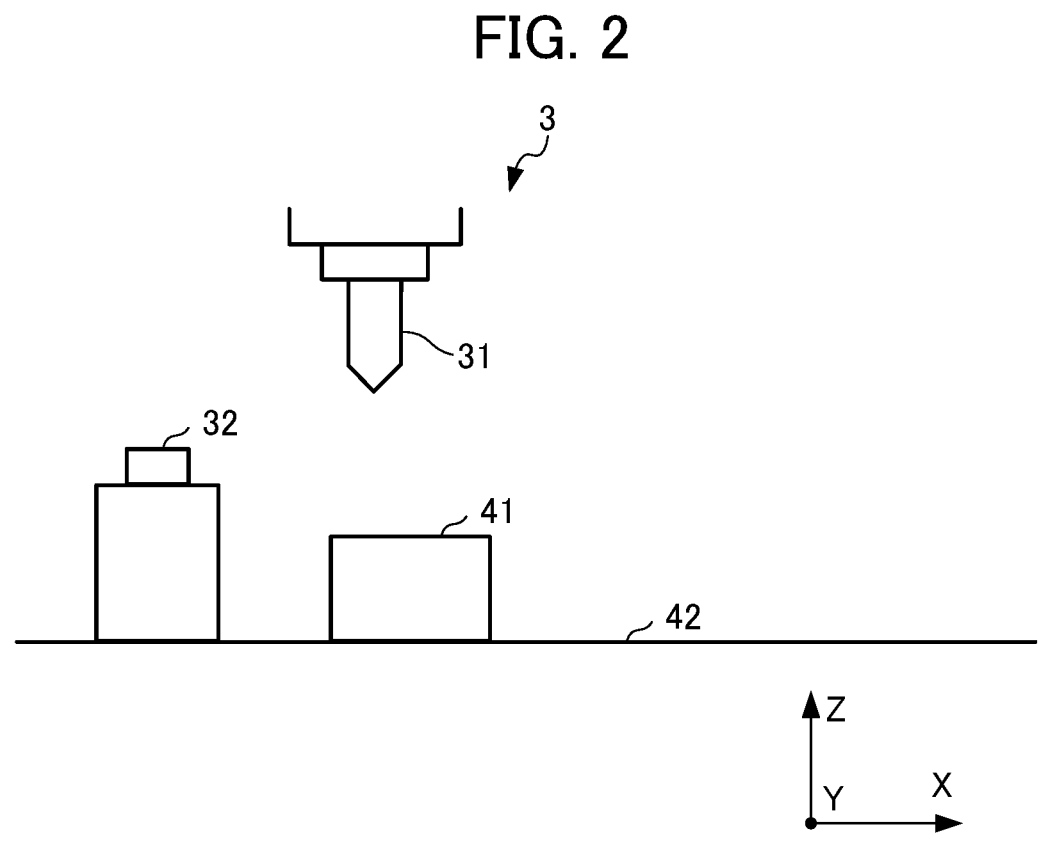

The machine tool 3 is a device that performs the predetermined machining such as cutting, tool measurement, etc. based on control by the numerical control device 2. FIG. 2 is a view showing the outline of the machine tool 3.

The machine tool 3 includes, for example, a motor driven to machine a workpiece 41, a spindle and a feed shaft attached to the motor, a jig and a tool for each of these shafts, and a table 42 for fixing the workpiece 41. The machine tool 3 drives the motor based on an operation command output from the numerical control device 2, thereby performing the predetermined machining. Specifically, the machine tool 3 includes a cutting tool 31 and a tool measuring instrument 32.

Next, operation of the tool measuring system 1 will be described. Plural types of cutting tools 31 are prepared according to a purpose for machining. Each cutting tool 31 is replaced with attached to a dedicated tool holder. A specific tool number is assigned to each cutting tool 31.

The tool measuring instrument 32 is a contact or contactless measuring instrument. For example, the contact tool measuring instrument 32 detects an edge of the cutting tool 31 according to contact of the cutting tool 31 with, e.g., a detection switch, a probe, or a plunger. For example, the contactless tool measuring instrument 32 detects the edge of the cutting tool 31 by means of, e.g., a laser beam and a laser beam light receiving unit.

The tool moving unit 211 moves the cutting tool 31 to the tool measuring instrument 32 in the machine tool 3. Specifically, the machine tool 3 moves the cutting tool 31 in the horizontal direction (an X-axis direction and a Y-axis direction) and the vertical direction (a Z-axis direction) by the motor and a drive shaft, thereby moving the cutting tool 31 to the tool measuring instrument 32.

The tool measuring unit 212 calculates the length and diameter of the cutting tool 31 based on the coordinates of the detected edge of the cutting tool 31.

The tool correcting unit 213 feeds back the measured length and diameter of the cutting tool 31 to tool length and diameter correction numbers for the cutting tool 31. Thus, the tool measuring system 1 can correct the length and diameter values of the cutting tool 31 according to the measured length and diameter of the cutting tool 31.

The program computing unit 214 computes a command executable by the machine tool 3 from a one-line control program for commanding the machine tool 3 to operate the tool measuring instrument 32, the tool moving unit 211, the tool measuring unit 212, and the tool correcting unit 213.

Specifically, the control program includes a G-code, a measurement mode, a tool start number, a tool end number, the tool length and diameter correction numbers, a temporal tool length, X-direction positioning, Y-direction positioning, Z-direction positioning, a spindle phase, and a first feed speed.

The G-code described herein indicates the function of measuring the cutting tool 31 by means of the one-line control program in the machine tool 3. The measurement mode indicates a mode for measuring the cutting tool 31. The tool start number and the tool end number each indicate the number of the cutting tool 31 for which measurement is started and the number of the cutting tool 31 for which measurement is finished.

The tool length correction number is a number for correcting the tool length according to a specified number, and the machine tool 3 corrects the tool length according to the specified number. The tool diameter correction number is a number for correcting the tool diameter according to a specified number, and the machine tool 3 corrects the tool diameter according to the specified number. The temporal tool length is a temporal tool length before measurement of the cutting tool 31.

The X-direction positioning, the Y-direction positioning, and the Z-direction positioning each indicate positioning in the linear X-, Y-, and Z-axis (the axes of coordinates) directions. The spindle phase is the rotation angle position of a spindle, and the machine tool 3 rotates the cutting tool 31 to a measurement target blade based on the spindle phase. The first feed speed indicates the feed speed of the cutting tool 31 from the origin of each linear axis (the X-axis, the Y-axis, and the Z-axis).

FIG. 3 is a view showing a specific example of the control program. In the example shown in FIG. 3, the G-code is G910, and S, T, E, H, D, B, X, Y, C, F, and M are used as parameters. G910 is a G-code for measuring the cutting tool 31 according to the one-line control program in the machine tool 3.

The parameter S indicates the measurement mode, the parameter H indicate the tool length and diameter correction numbers for the cutting tool 31, and the parameter D indicates tool length and diameter correction start numbers for the cutting tool 31. Note that the parameters S and H are essential values.

The parameters T, E, B, X, Y, C, F, and M each indicate the tool start number, the tool end number, the temporal tool length, the X-direction positioning, the Y-direction positioning, the spindle phase, the first feed speed, and a program stop before measurement. Note that the parameters T, E, B, X, Y, C, F, and M are optional values.

The program computing unit 214 specifies, for measuring the length and diameter of the cutting tool 31, the feed speed of the cutting tool 31 from the origin of each linear axis (the X-axis, the Y-axis, and the Z-axis) of the machine tool 3 in the control program. Specifically, the program computing unit 214 specifies the value of the parameter F in the control program, thereby specifying the feed speed of the cutting tool 31 from the origin of each linear axis of the machine tool 3.

Moreover, the program computing unit 214 specifies, for measuring the cutting tool 31 after replacement thereof, the tool number of the cutting tool 31 in the control program when measurement of the cutting tool 31 is commanded. Specifically, the program computing unit 214 specifies the parameter T as the tool start number in the control program, thereby specifying the tool number of the cutting tool 31.

Further, the program computing unit 214 specifies all of the cutting tools 31 or a predetermined tool number range in the control program when measurement of the cutting tool 31 is commanded. Specifically, the program computing unit 214 specifies the parameter T as the tool start number and the parameter E as the tool end number in the control program, thereby specifying all of the cutting tool 31 or the predetermined tool number range.

In addition, the program computing unit 214 specifies, for measuring an optional height on a plane perpendicular to the cutting tool 31, at least one linear axis perpendicular to the axis along which the cutting tool 31 is held, in the control program when measurement of the cutting tool 31 is commanded. Specifically, the program computing unit 214 specifies at least one linear axis (at least one of the X-axis or the Y-axis) perpendicular to the axis (the Z-axis) along which the cutting tool 31 is held, in the control program. With this configuration, the tool measuring system 1 can measure a tool having a trapezoidal shape, for example.

Figure 4:
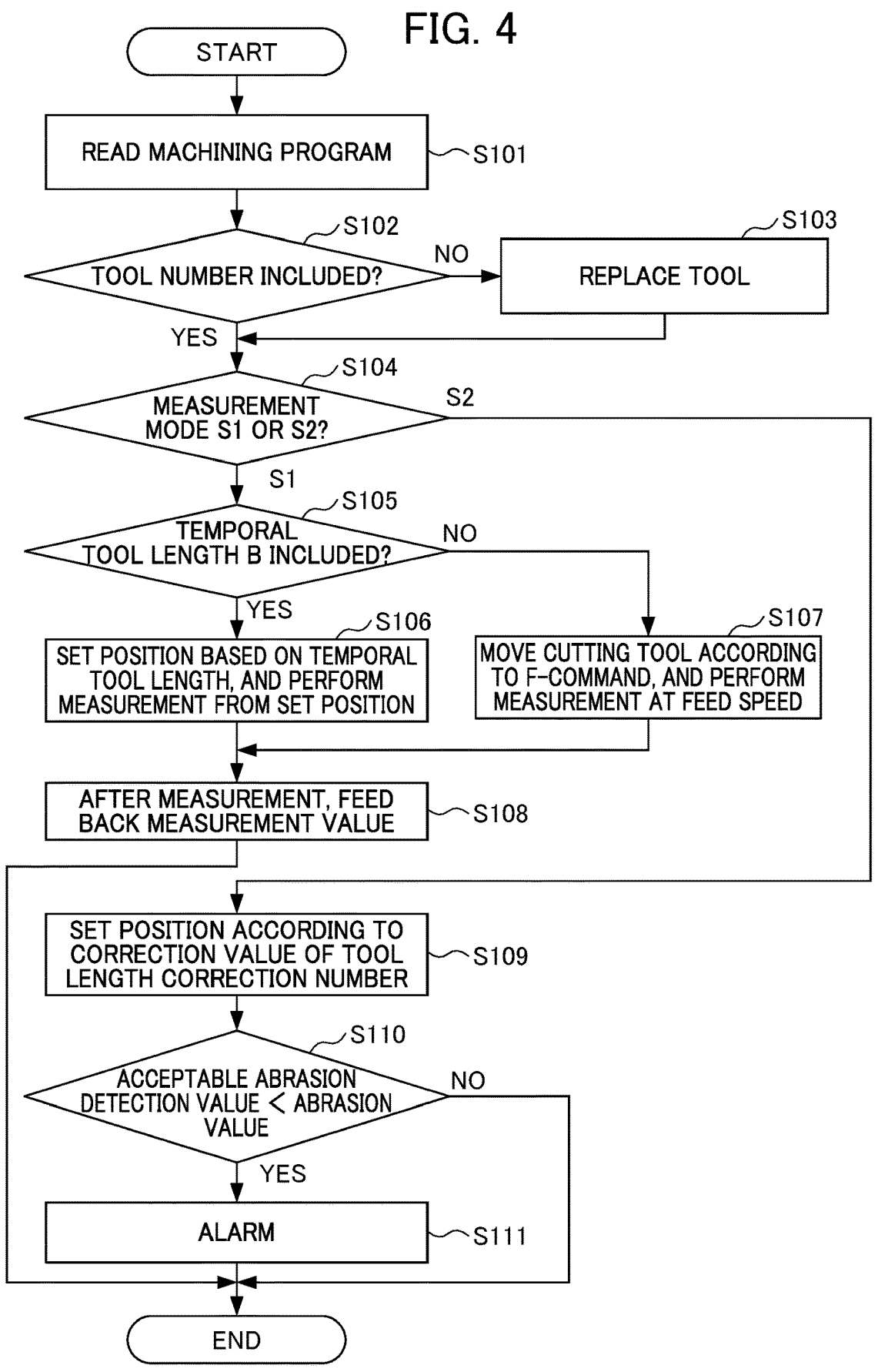
FIG. 4 is a flowchart showing the processing of the tool measuring system.

FIG. 4 is a flowchart showing the processing of the tool measuring system 1. In Step S101, the program computing unit 214 reads the machining program from the storage unit (not shown).

In Step S102, the program computing unit 214 determines whether or not the machining program includes the tool start number T. In a case where the machining program includes the tool start number T (YES), the processing proceeds to Step S103. In a case where the machining program does not include the tool start number T (NO), the processing proceeds to Step S104.

In Step S103, the numerical control device 2 causes the machine tool 3 to replace the cutting tool 31. In Step S104, the program computing unit 214 determines whether the measurement mode is S1 or S2 in the machining program. In a case where the measurement mode is S1, the processing proceeds to Step S105. In a case where the measurement mode is S2, the processing proceeds to Step S109.

In Step S105, the program computing unit 214 determines whether or not the machining program includes the temporal tool length B command. In a case where the temporal tool length B command is included (YES), the processing proceeds to Step S106. In a case where the temporal tool length B command is not included (NO), the processing proceeds to Step S107.

In Step S106, according to the temporal tool length, the numerical control device 2 fast-forwards the cutting tool 31 to the tool measuring instrument 32 and sets the position of the cutting tool 31 at the tool measuring instrument 32. Then, the numerical control device 2 performs measurement from the set position. With this configuration, the numerical control device 2 can move the cutting tool 31 to a position immediately before a measurement position of the tool measuring instrument 32 by fast-forwarding.

In Step S107, the numerical control device 2 moves the cutting tool 31 to the tool measuring instrument 32 at the feed speed F, and performs measurement at such a feed speed. With this configuration, the numerical control device 2 can easily perform measurement from the Z-axis without the temporal tool length.

In Step S108, the tool measuring instrument 32 feeds back a measurement value to the numerical control device 2 according to the commands of the parameters H and D. At this point, the numerical control device 2 sets, in measurement operation, the position of the cutting tool 31 at the tool measuring instrument 32 according to the commands of the parameters X and Y. Moreover, the numerical control device 2 sets the spindle phase for measuring, e.g., an edge of a cutting tool for milling according to the command of the parameter C.

In Step S109, the numerical control device 2 sets the position of the cutting tool 31 at the tool measuring instrument 32 according to a correction value of the tool length correction number.

In Step S110, the tool measuring instrument 32 executes measurement of abrasion of the cutting tool 31. Then, the tool measuring instrument 32 determines whether or not an abrasion value of the cutting tool 31 exceeds an acceptable abrasion detection value. In a case where the abrasion value exceeds the acceptable abrasion detection value (YES), the processing proceeds to Step S111. In a case where the abrasion value is equal to or less than the acceptable abrasion detection value (NO), the tool measuring instrument 32 ends abrasion measurement, and then, the processing ends.

In Step S111, the machine tool 3 issues an alarm for informing the abrasion value exceeding the acceptable abrasion detection value, and thereafter, the processing ends.

As described above, according to the present embodiment, the tool measuring system 1 includes the tool measuring instrument 32 that detects the edge of the cutting tool 31 in the machine tool 31, the tool moving unit 211 that moves the cutting tool 31 to the tool measuring instrument 32 in the machine tool 3, the tool measuring unit 212 that measures the length and diameter of the cutting tool 31 based on the coordinates of the edge detected by the tool measuring instrument 32, the tool correcting unit 213 that feeds back the measured length and diameter of the cutting tool 31 to tool length and diameter correction numbers for the cutting tool 31, and the program computing unit 214 that computes a command executable by the machine tool 3 from the one-line control program for commanding the machine tool 3 to operate the tool measuring instrument 32, the tool moving unit 211, the tool measuring unit 212, and the tool correcting unit 213.

Typically, a worker needs to create, as the technique of measuring a cutting tool in a machine tool 3, a macro program having branches according to various measurement specifications, and also needs to have a skill for programming. A worker unfamiliar with programming cannot create an optimal program, leading to the probability of damaging a measuring instrument due to operation of an erroneous program. The tool measuring system 1 according to the present embodiment creates the one-line control program for commanding the machine tool 3 to operate the tool measuring instrument 32, the tool moving unit 211, the tool measuring unit 212, and the tool correcting unit 213. With this configuration, the tool measuring system 1 can easily measure the cutting tool by the one-line control program.

The control program includes the G-code, the measurement mode, the tool start number, the tool end number, the tool length and diameter correction numbers, the temporal tool length, the X-direction positioning, the Y-direction positioning, the Z-direction positioning, the spindle phase, and the first feed speed. With this configuration, the tool measuring system 1 can measure the cutting tool 31 by the control program by proper operation of the machine tool 3 and the numerical control device 2.

The program computing unit 214 specifies, for measuring the length and diameter of the cutting tool 31, the feed speed of the cutting tool 31 from the origin of each linear axis (the X-axis, the Y-axis, and the Z-axis) of the machine tool 3 in the control program. With this configuration, the tool measuring system 1 can suitably measure the length and diameter of the cutting tool 31.

The program computing unit 214 specifies, for measuring the cutting tool 31 after replacement thereof, the tool number of the cutting tool 31 in the control program when measurement of the cutting tool 31 is commanded. With this configuration, the tool measuring system 1 can measure the cutting tool 31 after replacement thereof.

The program computing unit 214 specifies all of the cutting tools or the predetermined tool number range in the control program when measurement of the cutting tool 31 is commanded. With this configuration, the tool measuring system 1 can properly specify the tool number of the cutting tool 31.

The program computing unit 214 specifies, for measuring the optional height on the plane perpendicular to the cutting tool 31, at least one linear axis perpendicular to the axis along which the cutting tool 31 held, in the control program when measurement of the cutting tool 31 is commanded. The tool measuring system 1 can measure the tool having the trapezoidal shape, for example.

The embodiment of the present invention has been described above, but the present invention is not limited to the above-described embodiment. The advantageous effects described in the present embodiment have merely been listed as most suitable advantageous effects of the present invention, and the advantageous effects of the present invention are not limited to those described in the present embodiment.

EXPLANATION OF REFERENCE NUMERALS

1 Tool Measuring System
2 Numerical Control Device
3 Machine Tool
21 Control Unit
31 Cutting Tool
32 Tool Measuring Instrument
211 Tool Moving Unit
212 Tool Measuring Unit
213 Tool Correcting Unit
214 Program Computing Unit

The invention claimed is:

1. A tool measuring system comprising:
a processor; and
a tool measuring instrument that detects an edge of a cutting tool in a machine tool,
wherein the processor is configured to:
move the cutting tool to the tool measuring instrument in the machine tool;
measure length and diameter of the cutting tool based on coordinates of the edge detected by the tool measuring instrument;
feed back the measured length and diameter of the cutting tool to tool length correction numbers and diameter correction numbers for the cutting tool, the tool length correction numbers being numbers for correcting the tool length according to a specified number, and the tool diameter correction numbers being numbers for correcting the tool diameter according to a specified number; and compute a command executable by the machine tool from a one-line control program for commanding the machine tool, wherein the one-line control program includes at least a G-code, a measurement mode, and the tool length correction numbers and diameter correction numbers, and the G-code is a code for measuring the cutting tool according to the one-line control program in the machine tool.

2. The tool measuring system according to claim 1, wherein the one-line control program includes a tool start number, a tool end number, a temporal tool length, X-direction positioning, Y-direction positioning, Z-direction positioning, a spindle phase, and a first feed speed.

3. The tool measuring system according to claim 1, wherein the processor specifies, for measuring the length and diameter of the cutting tool, a feed speed of the cutting tool from an origin of each of linear axes of the machine tool in the one-line control program.

4. The tool measuring system according to claim 1, wherein the processor specifies, for measuring the cutting tool after replacement thereof, a tool number of the cutting tool in the one-line control program when measurement of the cutting tool is commanded.

5. The tool measuring system according to claim 1, wherein the processor specifies all cutting tools or a predetermined tool number range in the one-line control program when measurement of the cutting tool is commanded.

6. The tool measuring system according to claim 1, wherein the processor specifies, for measuring an optional height on a plane perpendicular to the cutting tool, at least one linear axis perpendicular to an axis along which the cutting tool is held, in the one-line control program when measurement of the cutting tool is commanded.

7. A method for controlling a tool measuring system, comprising:

a step of computing a command executable by a machine tool from a one-line control program for commanding the machine tool;

a step of detecting an edge of a cutting tool in the machine tool according to the executable command;

a step of moving the cutting tool to a tool measuring instrument in the machine tool according to the executable command;

a step of measuring, according to the executable command, length and diameter of the cutting tool based on coordinates of the edge detected by the tool measuring instrument; and a step of feeding back the measured length and diameter of the cutting tool to tool length correction numbers and diameter correction numbers for the cutting tool according to the executable command, the tool length correction numbers being numbers for correcting the tool length according to a specified number, and the tool diameter correction numbers being numbers for correcting the tool diameter according to a specified number, wherein the one-line control program includes at least a G-code, a measurement mode, and the tool length correction numbers and diameter correction numbers, and the G-code is a code for measuring the cutting tool according to the one-line control program in the machine tool.

* * * * *